US005634734A

United States Patent [19]

Schron, Jr. et al.

[11] Patent Number: 5,634,734

[45] Date of Patent: Jun. 3, 1997

[54] HOIST DEVICE

[75] Inventors: Jack H. Schron, Jr., Chagrin Falls; Harry P. Fuller, Newbury; James C. Klingenberg, Concord, all of Ohio

[73] Assignee: Jergens, Inc., Cleveland, Ohio

[21] Appl. No.: 542,947

[22] Filed: Oct. 13, 1995

[51] Int. Cl.$^6$ .................................................... F16G 15/08

[52] U.S. Cl. ............................. 403/78; 403/79; 403/164; 294/82.1; 294/1.1

[58] Field of Search .................................... 403/164, 165, 403/78, 79, 119, 337; 294/1.1, 89, 82.1; 410/101; 59/95

[56] References Cited

U.S. PATENT DOCUMENTS

| | | | |
|---|---|---|---|
| 3,297,293 | 1/1967 | Andrews et al. | 248/361 |
| 3,371,951 | 3/1968 | Bryant | 294/89 X |
| 3,492,033 | 1/1970 | Mueller | 294/82.1 X |
| 3,905,633 | 9/1975 | Larson | 294/1.1 |
| 4,074,519 | 2/1978 | Garrett | 403/164 X |
| 4,431,352 | 2/1984 | Andrews | 410/101 |
| 4,557,513 | 12/1985 | Ferrieri | 294/1.1 |
| 4,558,979 | 12/1985 | Andrews | 410/101 |
| 4,570,987 | 2/1986 | Wong et al. | 294/1.1 |
| 4,592,686 | 6/1986 | Andrews | 410/101 |
| 4,641,986 | 2/1987 | Tsui et al. | 403/164 |
| 4,699,410 | 10/1987 | Seidel | 403/119 X |
| 4,705,422 | 11/1987 | Tsui et al. | 403/60 |
| 5,183,360 | 2/1993 | Freman | 294/82.1 X |
| 5,248,176 | 9/1993 | Fredriksson | 403/164 X |
| 5,286,130 | 2/1994 | Mueller | 403/165 X |
| 5,352,056 | 10/1994 | Chandler | 403/78 X |
| 5,405,210 | 4/1995 | Tsui | 403/165 X |

FOREIGN PATENT DOCUMENTS

| | | | |
|---|---|---|---|
| 179733 | 4/1986 | European Pat. Off. | 294/1.1 |
| 3435961 | 4/1986 | Germany | 294/1.1 |

OTHER PUBLICATIONS

Brochure "Jergens Hoist Unmatched Lifting Flexibility".

*Primary Examiner*—Harry C. Kim
*Attorney, Agent, or Firm*—Vickers, Daniels & Young

[57] ABSTRACT

A hoist device designed to fixedly engage a threaded bore on the outer surface of a load number as a die. The hoist device includes a low engaging stud having a threaded shank depending from an annular shoulder of the body portion of the stud, a base member having a body portion which supports the low engaging stud and allows for a free swivel engagement of the base member with the stud when the stud is fixed to the load member, a hoist ring which is pivotly connected to the base member.

28 Claims, 8 Drawing Sheets

FIG. 3
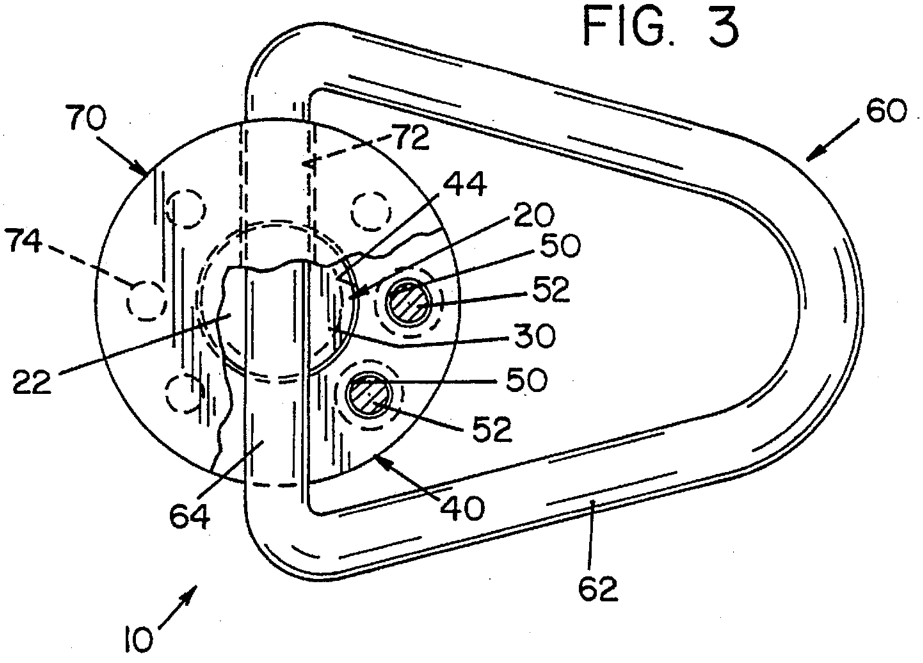
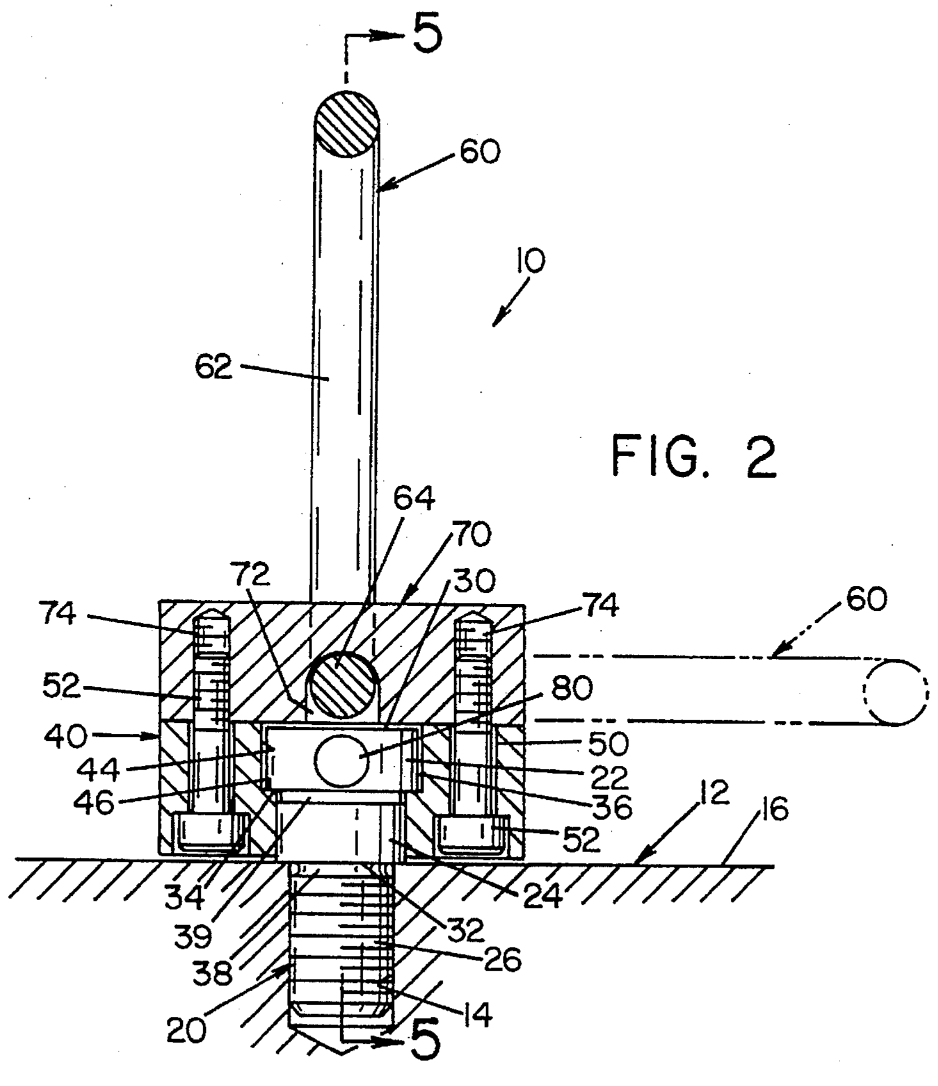
FIG. 2

FIG. 9
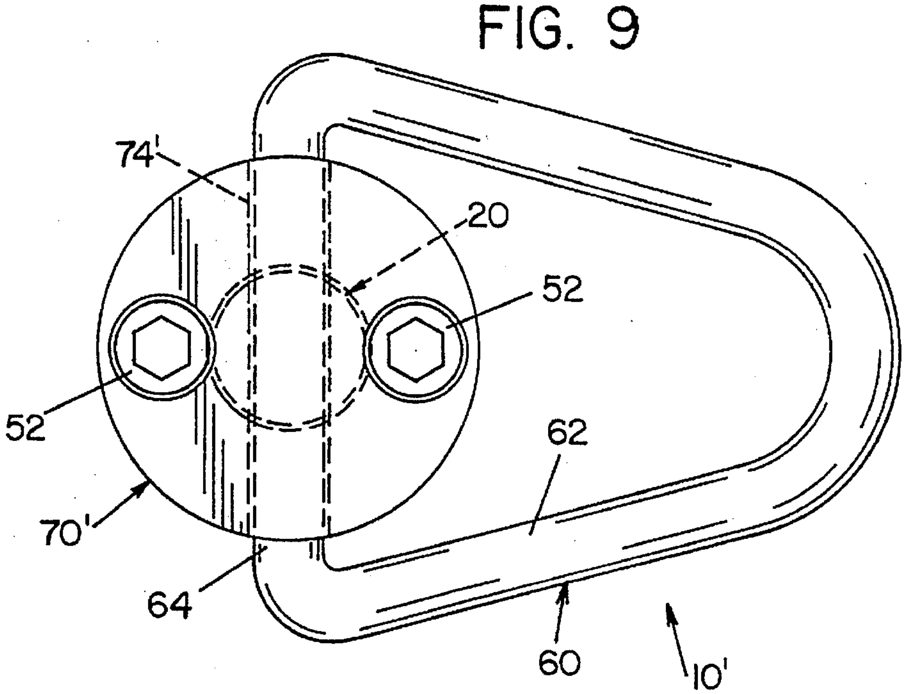
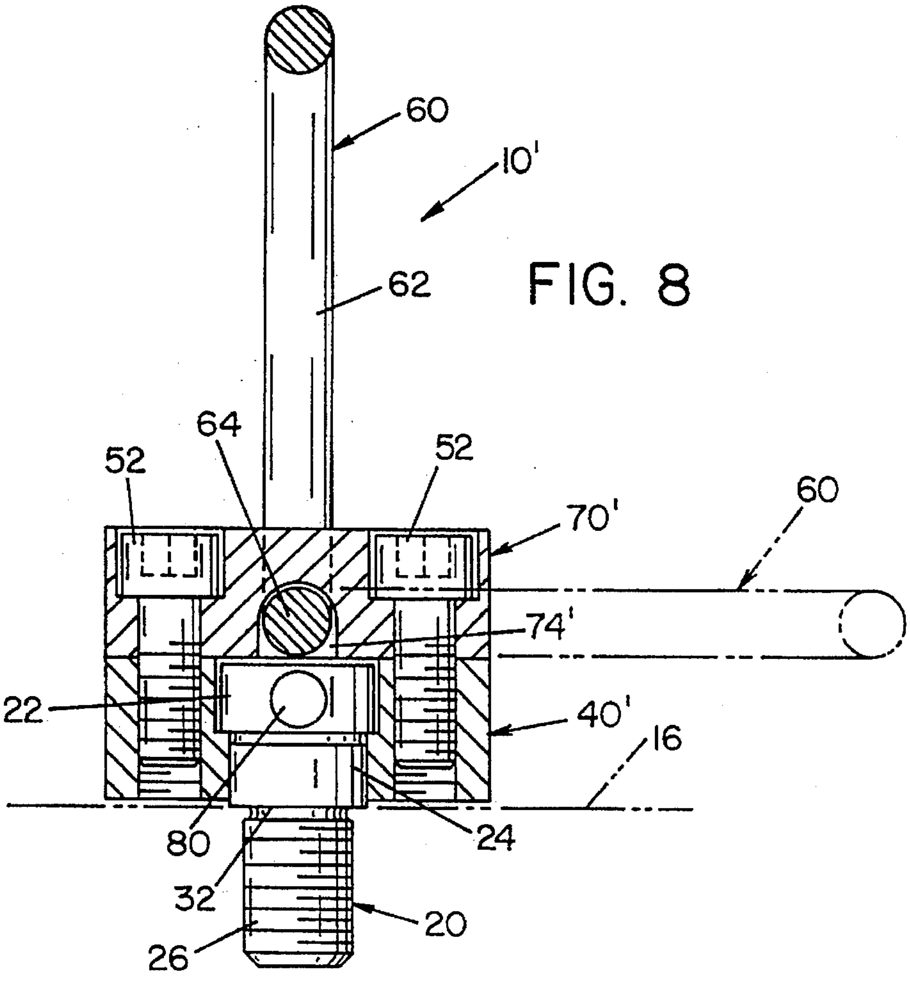
FIG. 8

HOIST DEVICE

The present invention relates to the art of lifting or hoisting relatively heavy loads and more particularly to a hoist device for connection to a heavy load that is to be hoisted by a crane or assembler mechanism.

INCORPORATION BY REFERENCE

Incorporated by reference herein are Andrews 3,297,293; Andrews 4,431,352; Wong 4,570,978; Andrews 4,592,686 and Tsui 4,641,986. These patents all relate to a hoist device including a clevis that is pivoted through 180° and secured to a load member for supporting structure by a swivel mechanism wherein a stud is mounted in the load member or support structure in a manner to clamp a bushing between the stud and the member. The clevis is rotated around the bushing in a support or load bearing ring. These prior mechanisms together with fixed eye bolts and pivotively connected eye bolts are well known in the art and are incorporated herein by reference so that these structures need not be repeated. The eye bolts, either fixed or pivoted, are extremely inexpensive but they do not provide the swivel connection and versatility of the prior art also incorporated by reference herein.

BACKGROUND OF THE INVENTION

The present invention relates to a hoist device which can be used to lift a variety of heavy loads or objects such as dies, vehicles, internal combustion engines, etc. and it will be described with particular reference thereto; however, the invention has much broader applications and may be used for a variety of applications where it is necessary to secure a ring to a structure either to lift the structure or to for hold down a structure such as containers, airplanes, air vehicles, boats, etc.

The least expensive hoist device of the type to which the present invention is directed, is a standard eye bolt which is a ring cast with a depending shank which is threaded to be received in a threaded bore provided on the member to be lifted or hoisted. A mechanical hoist having a line with a hook is then used to lift the device by applying the hook through the eye bolt and operating the hoist device. Since an eye bolt is quite inexpensive, it is generally used in most high production applications such as motors, welders, generators, combustion engines, etc. Such commodities are provided with eye bolts so that they can be hoisted and maneuvered into the desired position. The difficulty with the eye bolt is that it cannot compensate for lifting forces which are not actually aligned with the axis of the shank on the eye bolt. Thus, the eye bolts are usually made relatively heavy to compensate for the lack of versatility of the eye bolts.

Through the years, a large number of hoist devices have been developed which allow for the ring connected to the hook of the hoist to pivot and swivel for the purpose of automatically adjusting the disposition of the ring with respect to the force being applied by the hoist during the lifting procedure. Such devices are found in the patents incorporated by reference herein and all are extremely expensive. In addition, they generally have disadvantages. These prior devices cannot be easily disassembled and tested in the field. In addition, if they are assembled differently, they react and operate differently. Thus, they cannot be easily tested after use or reassembled and operate consistently. The reason for these disadvantages is because of the complexity of the structure necessary for accomplishing the swivel action. In addition, these devices utilize a clevis which is less strong than the continuous ring of an eye bolt.

The use of a clevis has been dictated by the structure necessary for accomplishing the swivel action in the prior devices. The swivel action is accomplished by a stud clamping a ring against a bushing. The bushing defines a track or guideway for a support ring to swivel about a bolt. In using such structures, the only manner in which a ring can be mounted to the support ring that can swivel is by employing a clevis construction. Such constructions are extremely expensive and cannot be disassembled and tested in the field. The weight and cross-section of the clevis must be such that it cannot be pulled away from the swivel ring mechanism. All of these requirements of the prior hoist rings which allow both swivel movement of the ring while also allowing the ring to move or pivot about the pins of the clevis contribute to the extreme cost, complexity, inability to disassemble or reassemble and test, and related problems.

THE PRESENT INVENTION

The present invention is an improvement in the art of hoist devices as defined above. In accordance with this improvement, the hoist device of the present invention has the advantages of an eye bolt or pivoted ring while also obtaining the desirability and benefit of allowing the hoist device to swivel through a full circle about the axis of the stud mounting the hoist device onto the load member. Consequently, the present invention overcomes the difficulties of fixed rings or other pivoted rings without the resulting costs associated with other efforts to provide both a pivoted and swiveling hoist ring.

In accordance with the present invention, there is provided a hoist device for fixed engagement to a threaded bore on the outer surface of a load member such as a die. The hoist device of the invention comprises a load engaging stud with a force supporting head, a cylindrical body portion with a lower, annular bearing shoulder and a threaded shank depending from the annular shoulder of the body portion. In some instances, the body portion can be formed from stock which is polyognal in cross-section. The term "cylindrical" is intended to be a general description of the preferred embodiment. In this manner, the stud having an upper head is threaded onto the load member. In accordance with the invention, the stud is used with a base member having a body portion with a central passage through the base member and allowing a swivel engagement of the base member with the stud when the support stud is fixed to the load member by threading the shank of the stud through the central passage into the load member bore until the lower bearing shoulder of the stud is drawn against the outer surface of the load member. With this arrangement, the base member is captured between the head of the stud and the load member. The stud has a stop which controls the movement of the stud member into the threaded bore of the load member. The stop or shoulder on the stud is used to place the shank of the stud in tension by torquing the stud in the threading operation. The central passage of the base member has enough recess for capturing the load supporting head of the stud and an upper annular shoulder means for transmitting a force from the base member to the supporting head of the stud when the base member is pulled from the load member during the lifting or hoisting operation.

As so far described, the invention does not use a bushing which is compressed to place the stud in tension. Such concept is normally applied in the prior art swivel hoist rings. The base member freely rotates about the stud whereas in the prior art the clamped bushing is non-rotatable. The clevis is engaged with the bushing in a manner to allow rotation with respect to the bushing. This is a completely different structure than the present invention wherein the base member rotates about its central passage captured between the head of the support stud and the member being lifted. In accordance with the present invention, the hoist ring has an upper bight portion and a lower generally cylindrical connecting portion connected to the body portion of the base member which is rotatable about the stud. A supporting member having a profile generally the same as the lower base member is fixedly secured to the base member so it rotates about the stud. By providing a slot in one of these members between the body portion of the upper support member and the body portion of the lower base member, the cylindrical connecting portion of the hoist ring is captured in the swivel assembly comprising the support member and base member. This assembly is relatively simple and allows both the pivoting action of the hoist ring as well as swivel action of the total assembly. There is no requirement for a clevis construction as required by the prior art when combining both the swivel action and the pivoting action of the ring.

In accordance with another aspect of the invention, the two body portions of the support member and the base member are generally cylindrical. The slot used in the invention is in one of the members. Preferably, the slot is in the support member; however, it may also be in the base member. Irrespective of the location of the slot, the continuous ring has a lower cylindrical connected portion extends between the two rotating members, the base member and the support member, to obtain the advantages of both an eye bolt and the complex, expensive multi-directional hoist vices heretofore available.

In accordance with another aspect of the invention, the hoist ring is forged steel; however, it can be cast iron or can be formed when an elongated bar bent into a continuous shape and welded at its touching ends. In practice, the steel is 4140; however, various types of steel such as low carbon steel can be employed in practicing the invention.

In accordance with another aspect of the present invention, a variety of arrangements could be provided for joining or securing fixedly the jointly rotating base member and ring support member. In practice this securing arrangement is preferably a plurality of bolts extending from one member to the other; however, the two members could be welded together or pins could be placed through the sides of one member for a permanently joined hoist device which would not need to be disassembled.

In accordance with still a further object of the present invention, the length of the load supporting head for the stud and the internal recess for capturing this head is positioned so that the head is movable in the recess even after the support member is in place. In this manner, the two joined members freely rotate about the head of the stud. In a like manner, the lower shoulder for the intermediate portion of the stud that is torqued against the outer surface of the load member extends outwardly from the lower portion of the base member for the hoist device. This extension is greater than the difference in height of the head and recess for the base member so that under no circumstance will the swiveling base member engage the outer surface of the load member being hoisted or lifted. Of course, this is a preferred arrangement for the device and the device would still rotate even if there were certain amounts of rubbing action. Such action is not desired and in accordance with one aspect of the invention, is mechanically prevented.

The primary object of the present invention is the provision of a hoist device which combines the advantages of an eye bolt and the advantages of both swiveling and rotating action.

Another object of the present invention is the provision of a hoist device, as defined above, which device is relatively inexpensive, incorporates a continuous ring instead of a clevis and is capable of being disassembled and tested after use.

Still a further object of the present invention is the provision of a hoist device, as defined above, which hoist device can be tested by non-destructive testing. These and other objects and advantages will become apparent from the following description. These and other objects and advantages will become apparent to those skilled in the art upon reading the following description taken together with the accompanying drawings.

BRIEF DESCRIPTION OF THE DRAWINGS

Reference may now be made to the drawings, which illustrate various embodiments that the invention may take in physical form and in certain parts and arrangements of parts wherein:

FIG. 2 is a side, partially cross-section view of the preferred embodiment of the present invention;

FIG. 3 is a top view somewhat cut away of the preferred embodiment of the present invention;

FIG. 8 is a cross-sectional view of the modification of the present invention illustrated in FIG. 7;

FIG. 9 is a top view of the present invention shown in FIG. 7;

PREFERRED EMBODIMENTS

Figure 1:
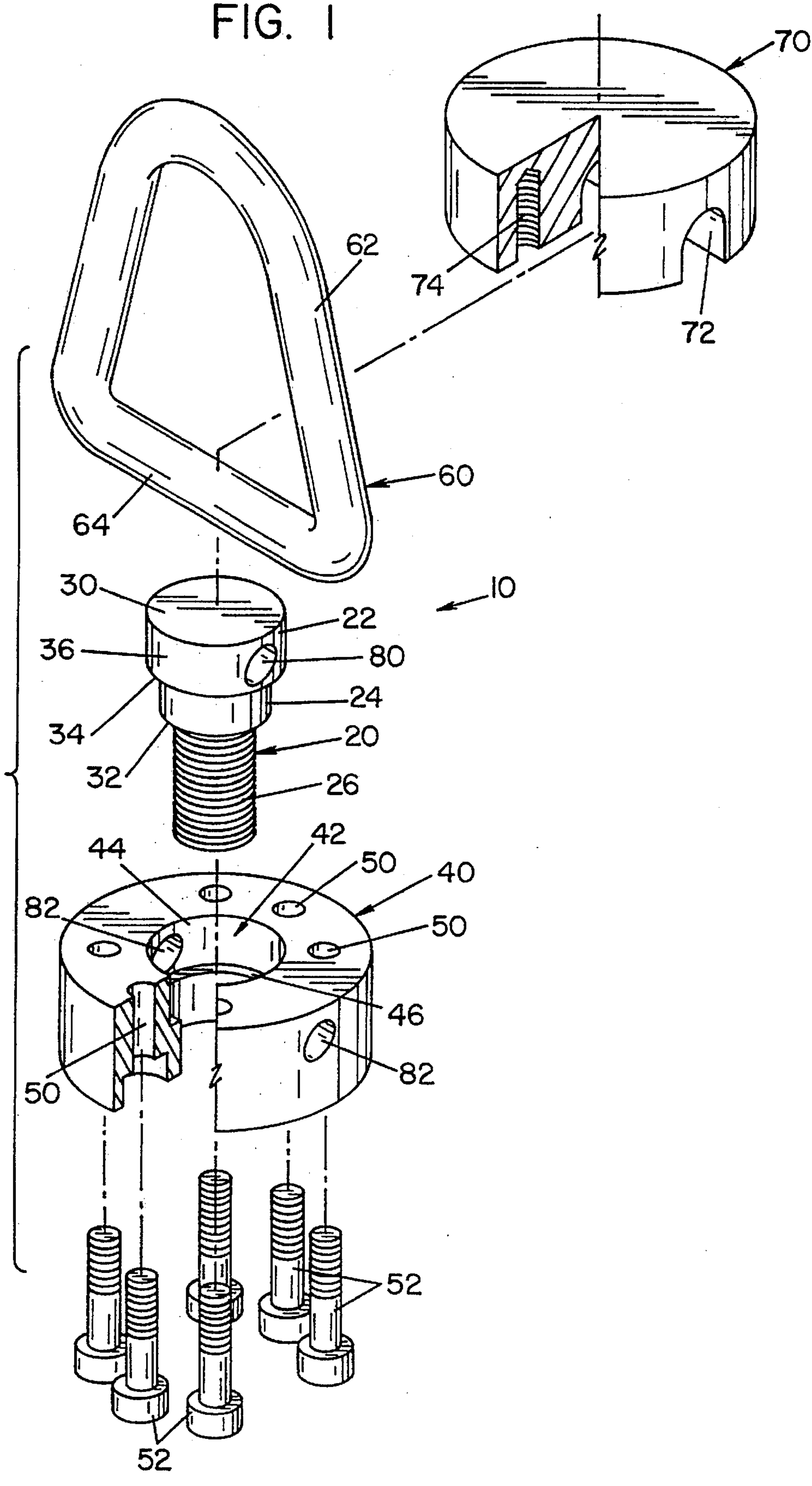
FIG. 1 is an exploded view of the preferred embodiment of the present invention.

Referring now to the drawings wherein the showing is for the purpose of illustrating preferred embodiments of the invention only and not for the purpose of limiting the same, FIGS. 1–5 show a hoist device 10 for connection to a load member 12 shown in FIG. 2. The member 12 has a threaded bore 14 and an upper generally flat surface 16 for illustrative purposes. A hoist device supporting stud 20 includes an upper cylindrical head 22 with a cylindrical body portion 24 below head 22 and terminating in a lower threaded shank 26. The diameters of the head, cylindrical body portion and threaded shank are progressively decreased as illustrated in FIG. 2. Stud 20 is the load bearing member which must absorb both shear and tension in operation of hoist device 10. The stud is illustrated with a top surface 30 having a lower bearing surface 32 which is torqued against surface 16 when stud 20 is in its load supporting position. The undersurface of head 22 defines a downwardly facing load supporting shoulder 34 which is an annular shoulder or surface below the cylindrical surface 36 of head 22. Stud 20 is illustrated as having a recessed portion 38 between shank 26 and body portion 24 so that the threads can be properly machined into shank 26. A similar recess 39 divides head 22 from body portion 24.

To provide the swivel mechanism of the preferred embodiment, a cylindrical base portion 40 is rotatably mounted on stud 20 after the stud has been passed through a central passage 42 of member 40. This central passage includes an upper recess 44 for capturing head 22 and has an upper shoulder 46 engaging shoulder 34 of head 22. This engagement is the force transmitting structure so that as member 40 is pulled upwardly shoulder 46 engages lower shoulder 34 of head 22 so the stud provides the lifting force for member 12. The central passage dimensions illustrated in FIG. 6 as they relate to the dimensions of the stud 20 so that member 40 swivels around the assembled stud 20. The base member also includes a plurality of counter sink bolt holes 50 for bolts 52. In the illustrated embodiment, fixed bolts are employed; however, as shown in other embodiments of the invention, two or four bolts could be employed for assembling the hoist device 10.

A continuous hoist ring 60 having an upper bight portion 62 and a straight cylindrical connecting portion 64 is provided by an appropriate process. In the preferred embodiment, hoist ring 60 is a continuous forged steel component. It could be a cast iron component or it could be formed into an appropriate shape from a single piece of steel and welded together. In accordance with the invention, the hoist ring is a continuous ring as opposed to a clevis as shown in the prior art which maintains its strength and integrity and prevents transfer separation even when a lifting hook is applied at the wrong angle in the lifting operation.

In accordance with the invention, a cylindrical port member 70 matching generally the shape of base member 40 is provided with a slot 72 for capturing cylindrical portion 64 of ring 60 between base member and support member 70. A plurality of threaded bores 74 co-act with bolt holes 50 to allow bolts 52 to clamp the cylindrical body portions of members 40, 70 together in a manner which captures hoist ring 60 between the two members. These members rotate in unison about stud 20 while hoist ring 60 can pivot through approximately 180°.

Hoist device 10 has the advantages of the continuous ring type hoisting device as well as the swiveling action heretofore obtainable only in a clevis type of hoist device. The present invention does not clamp a bushing between stud 20 and surface 16. Of course, such a bushing could be employed in some arrangement which would still obtain the advantages of the present invention but would replace the stationary cylindrical surface of the stud with the stationary surface of the clamped bushing.

In practice, a socket is provided in the top 30 of head 22 for the purpose of using an allen wrench for assembling stud 20 into threaded bore 14 on load member 12.

Figure 4:
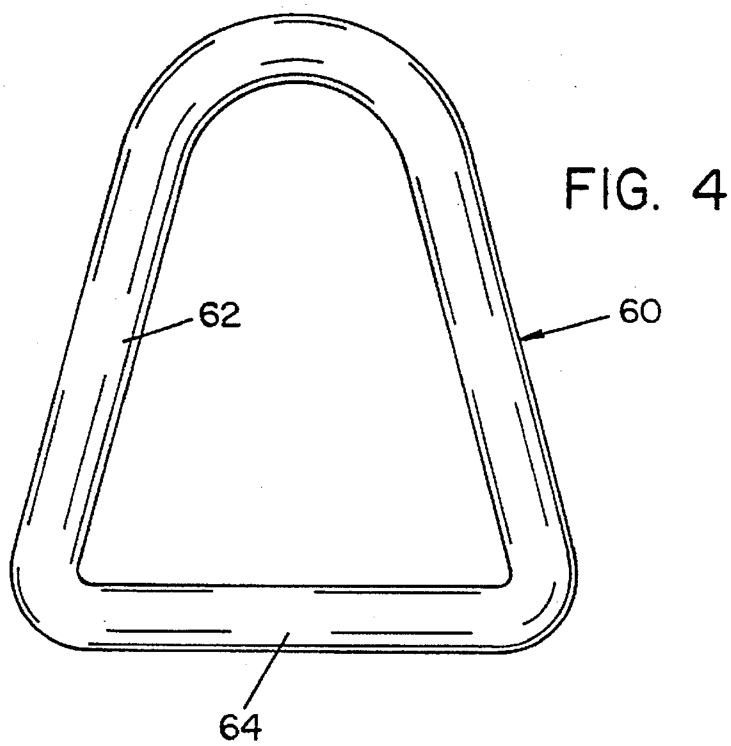
FIG. 4 is a side view of the hoist ring used in accordance with the present invention.
Figure 5:
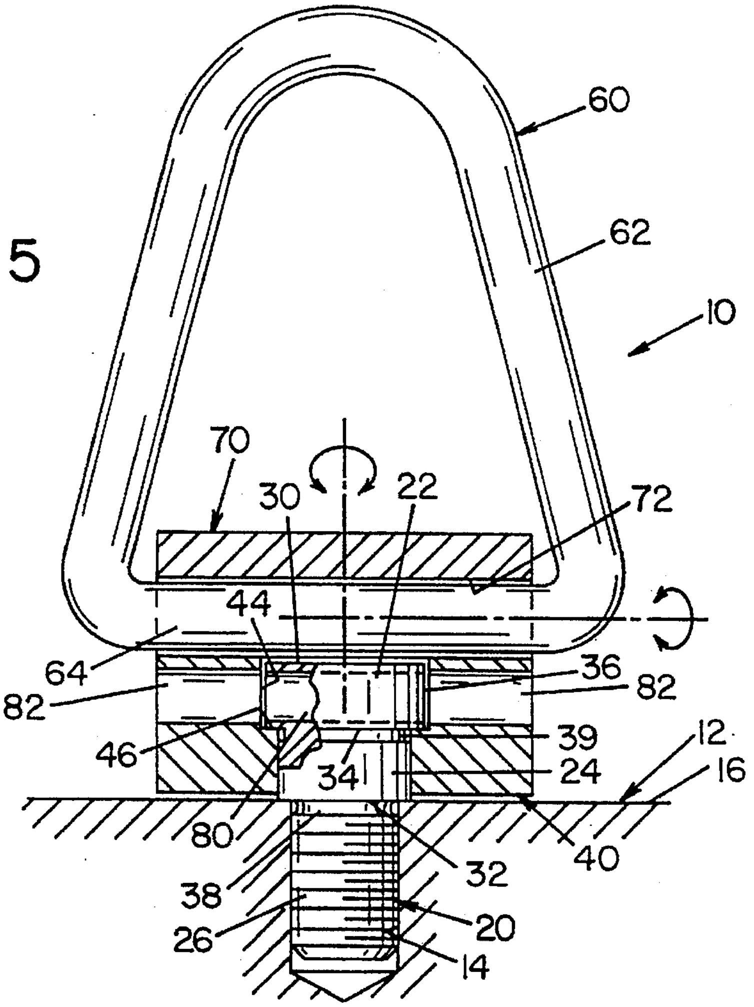
FIG. 5 is a cross-sectional view take on lines 5—5 of FIG. 2, showing the operating characteristics made possible by the implementation of the preferred embodiment of the present invention.

In accordance with another aspect of the invention, the socket can be replaced by the diametrically extending passage shown as a bore 80 through head 22. To assemble stud 20 into bore 14, bolts 52 assemble members 40, 70 for capturing stud 20 in recess 44 and cylindrical connecting portion 64 in slot 72. This is a total assembly which can be shipped to the place of ultimate use for hoist device 10. At the sight, an elongated rod or tool is pushed through holes 82 in base member 40. Stud 20 is rotated in recess 44 until passage or bore 80 registers with holes 82. The appropriate elongated tool then extends through head 22 of stud 20 so that the stud can be torqued into its proper position as shown in FIG. 2. The overall operating characteristics of the preferred embodiment of the invention is illustrated in FIG. 4.

The essential aspects of the invention are illustrated as including an arrangement for pivoting ring 60 as well as swiveling ring 60 by the swiveling action of the members 40, 70 after they have captured the stud and the connecting portion 64 of lifting ring 60.

Figure 6:
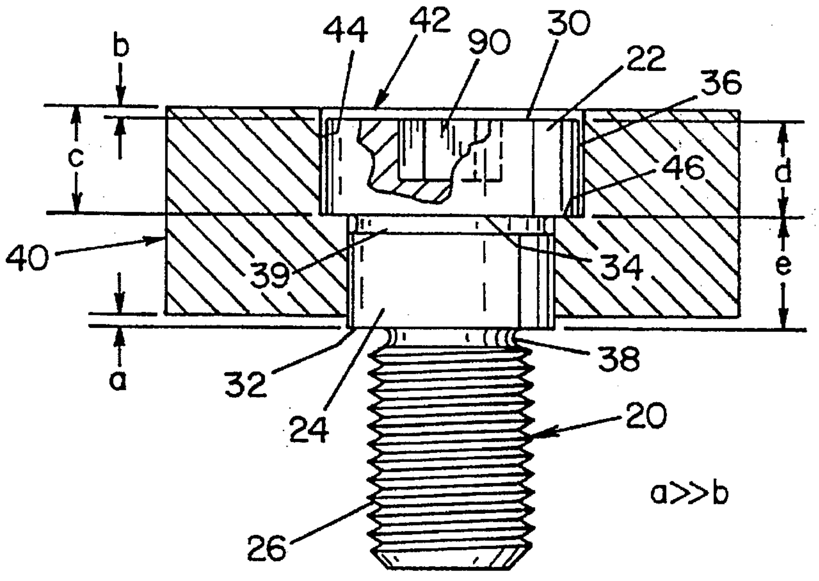
FIG. 6 is a cross-sectional view joining the dimensional aspects of the base member and load supporting stud employed in the preferred embodiment of the present invention.

Referring now to FIG. 6, certain dimensional aspects of the present invention are illustrated. These dimensions are apparent from the description of the invention; however, FIG. 6 illustrates that dimension a is the amount that portion 24 of stud 20 extends from base member 40 when head 22 is in its lowered position in recess 44. In that condition, dimension b is the clearance between the top of member 40 and the top 30 of head 22. In practice, dimension a is substantially greater than dimension b. In this fashion, the two members 40, 70, after secured together, are opted to their lowest extent, the lower surface of member 40 will not engage surface 16 while load member 12 is connected to stud 20. Dimension c is the height of recess 44. This dimension is greater than the height d of head 22. By this relative relationship of the height of the recess and the height of the head, the head does not bind in recess 44 after the lower flat surface of support member 70 is clamped against the upper flat surface of base member 40. As a final dimensional aspect, body portion 24 has an effective length e between the lower portion of head 22 and the lower bearing shoulder 32 of stud 20. The dimension e dictates the outward extension of portion 24 as illustrated by dimension a. These dimensions are provided to illustrate the preferred embodiment by which the present invention is manufactured to maintain a free swiveling action.

Figure 7:
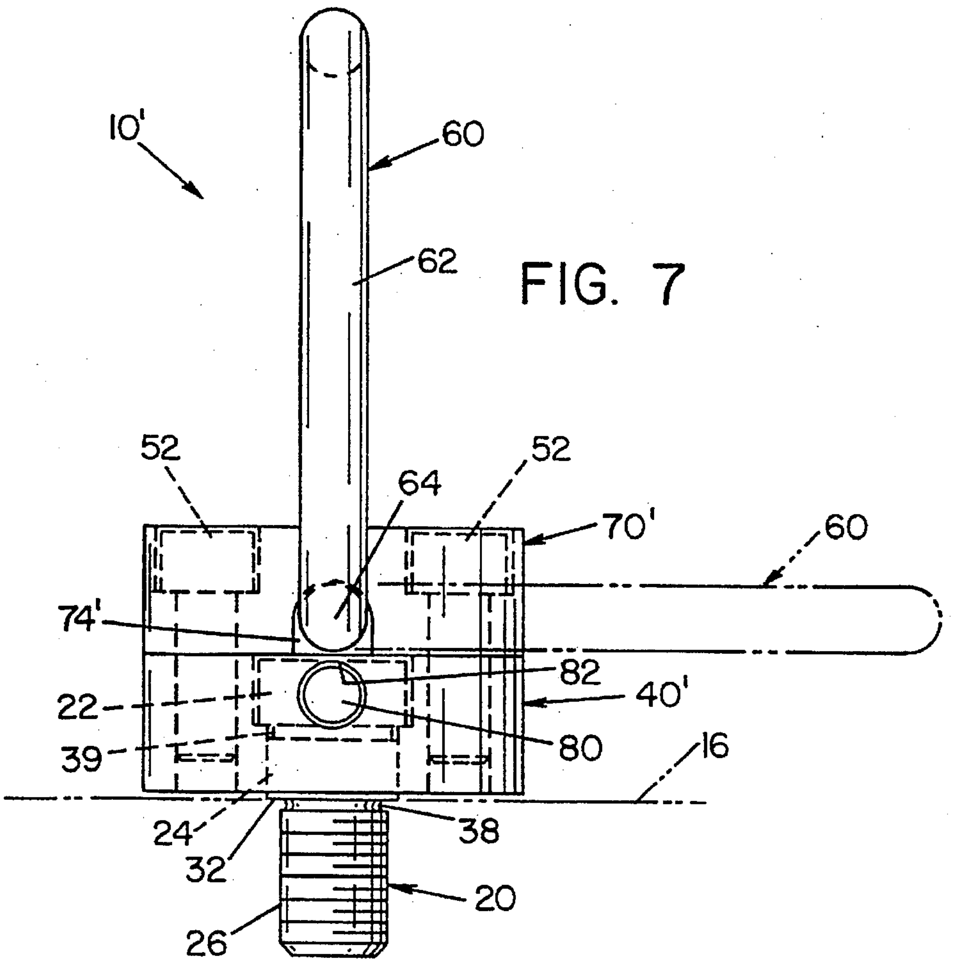
FIG. 7 is a view similar to FIG. 2 showing a modification of the preferred embodiment of the present invention.

Referring now to FIGS. 7–9, a modification of the preferred embodiment is illustrated wherein bolts 52 extend from the upper support member 70' into the lower base member 40'. In other respects, the embodiment shown in FIGS. 7–9 is the same as the preferred embodiment illustrated in FIGS. 1–4. The hoist device 101 operates in the same fashion. In this modification, the bolts will be exposed with use of hoist unit 10'. As previously described, a socket may be used for threading stud 20 into the threaded bore of load member 12. This structure is illustrated as socket 90 in FIG. 6. If such an arrangement were employed, then the embodiment of FIGS. 7–9 would provide simplicity in the field. Member 40' would be assembled over stud 20 which would be torqued into its proper position. Hereinafter, ring 60 would be assembled into slot 74' and then the cylindrical body portion of support member 70' would be assembled onto piece member 40' by bolts 52 as best shown in FIG. 8.

Figure 10:
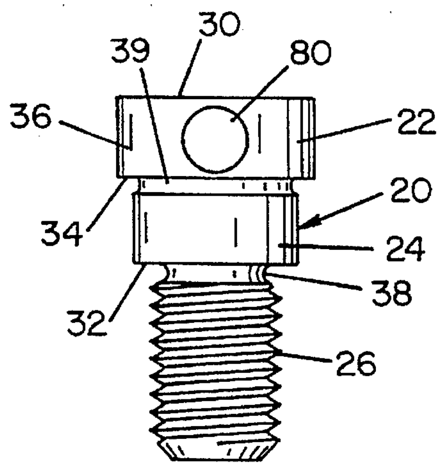
FIG. 10 is a side elevational view of the load supporting stud used in the preferred embodiment of the present invention.
Figure 11:
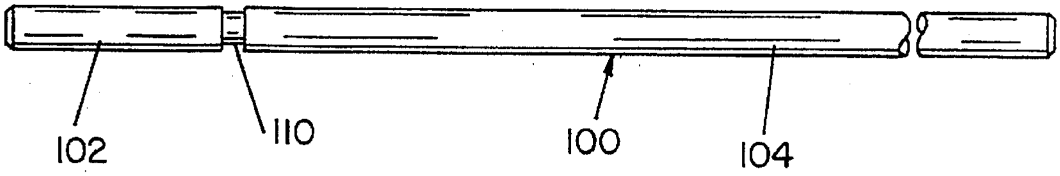
FIG. 11 is a side view of a torque controlling tool used with the stud shown in FIG. 10.
Figure 12:
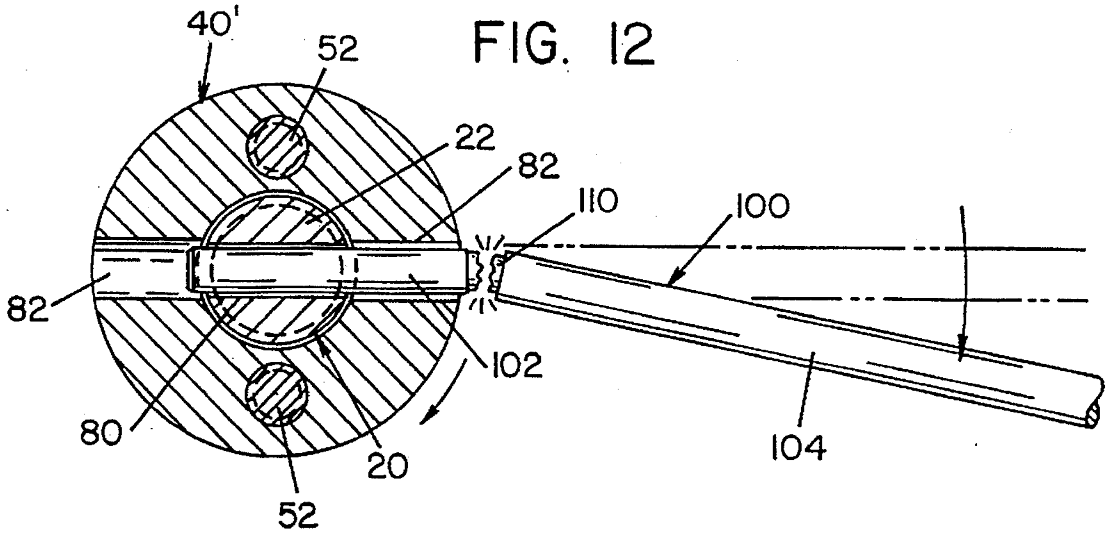
FIG. 12 is an operational view showing an embodiment of the invention in cross-section using the tool shown in FIG. 11 for controlling the torque applied to the load supporting stud shown in FIG. 10.

In accordance with a further aspect of the invention, the hoist device 10', is assembled by extending an elongated tool 100 through holes 82 and passage of bore 80 of head 22. This arrangement is illustrated in FIGS. 10-12. The elongated tool in practice may be a screwdriver or other similar device. By aligning bore 80 with holes 82 in the base member, an elongated tool is extended through the head of stud 20 so that the stud can be torqued into its proper position with the appropriate amount of force being exerted between the lower bearing shoulder 32 of body portion 24 and the upper surface of the load.

In accordance with an aspect of the invention, tool 100 is provided with an operating end 102 and a handle portion or end 104. Adjacent end 102 is a necked-down area 110 which has a cross-section determined by the torque to be applied to stud 20 in the assembly process. Tool 100 is hardened so that it will fracture the area 110 when the appropriate torque has been applied to stud 20. This concept is illustrated in FIG. 12. By using this concept, the arrangement for securing the two cylindrical members 40, 70 together would allow the application of the preferred embodiment illustrated in FIGS. 1–4. The bolts can be extended from the bottom member 40 to the top member 70. In summary, using the passage 80, an elongated tool is used to assemble stud 20.

In accordance with an aspect of the invention, the torque responsive tool 100 shown in FIG. 11 has certain advantages since it will result in consistent torquing of stud 20. Should it be desirable to prevent removal of stud 20, epoxy resin could be deposited in bore 80 of head 22 to prevent further use of elongated tool. This preventive measure is not a preferred aspect of the invention.

Figure 13:
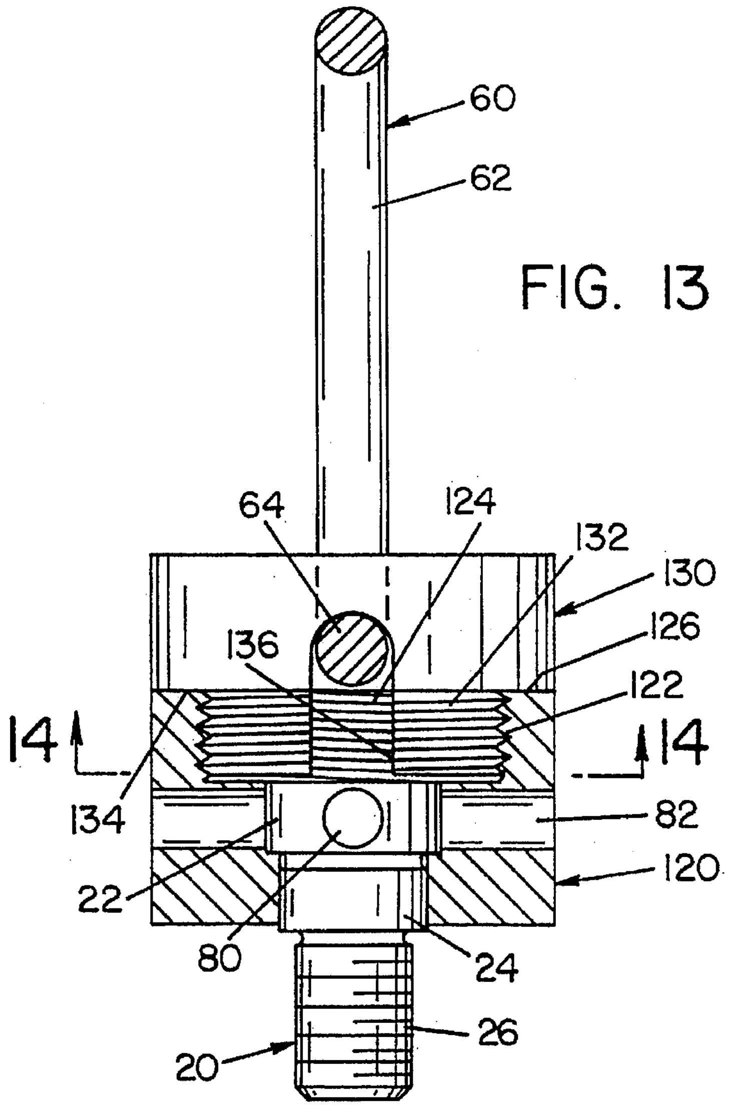
FIG. 13 is a side elevational view of still a further embodiment of the present invention.
Figure 14:
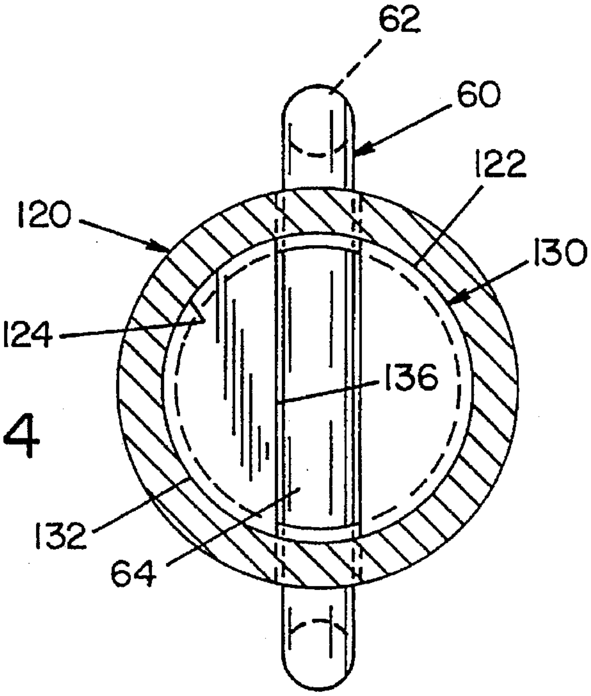
FIG. 14 is a cross-sectional view taken generally along line 14—14 of FIG. 13.

In accordance with another aspect of the invention, bolts 52 can be replaced by using threaded surfaces on the base member and the upper ring support member. In this aspect of the invention, the base member could be provided with female threads while the upper support member is provided with male threads. A hoist device using this concept is illustrated in FIGS. 13 and 14. Base member 120 includes a cylindrical recess 122 with relatively large diameter female threads 124 and a flat upper surface 126. Upper support member 130 has a downwardly extending cylindrical member with outwardly extending male threads 132. These threads coact with threads 124 to assemble members 120, 130. The lower surface 134 of member 130 is clamped against surface 126 by rotation of hoist ring 60 in slot 136. Slot 136 is fairly deep in the vertical direction to allow movement of hoist ring 60 when it is captured between the members and above the inner section of flat surfaces 136, 134.

Figure 15:
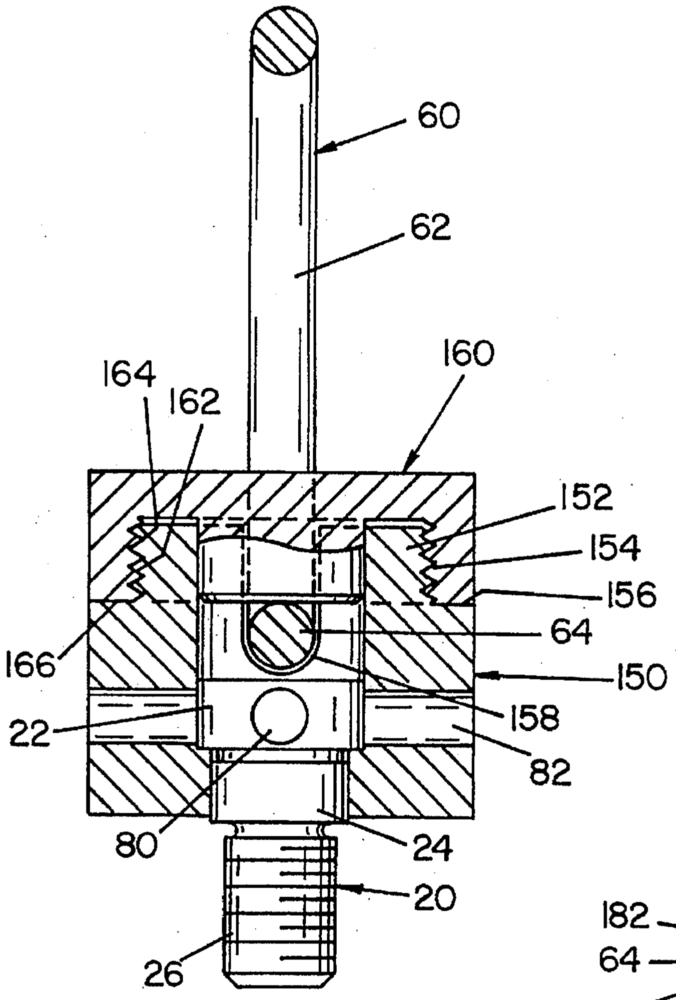
FIG. 15 is a cross-sectional view of still a further embodiment of the present invention.

FIG. 15. Base member 150 has an upper protrusion 152 with outwardly male threads 154 above the upper surface 156 of member 150. In this embodiment, lower base member 150 includes the slot 158 necessary for the capturing of ring 60. Upper support member 160 includes a cylindrical recess 162 with inwardly extending female threads 164 terminating in a lower flat surface 166. This surface coacts with surface 156 above that portion of slot 158 which captures portion 64 of ring 60. This arrangement allows for the use of threads on the support member and the base member but the threads are reversed from the structure shown in FIGS. 13 and 14. As can be seen, this reversal causes the slot for ring 60 to be positioned on the other member.

Figure 16:
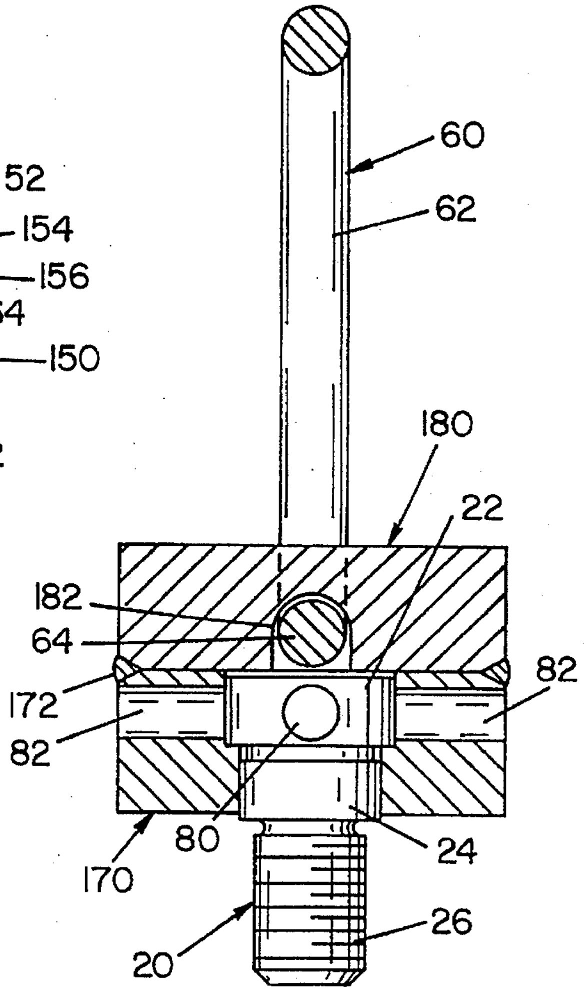
FIG. 16 is a side view, partially cut away, illustrating an additional arrangement for connecting the support member and base member of the illustrated embodiments of the present invention.

Another modification of the preferred embodiment is illustrated in FIG. 16 where the base member and the support member are permanently welded together. In the embodiment, base member 170 is secured by a peripherally extended weld seam 172 of the support member 180 having the slot 182 for capturing ring 60 between the two assembled members. Using this aspect of the invention, the hoist device is permanently assembled and requires the use of the bore 80 in stud 20 and holes 82 as previously described.

In another modification of the preferred embodiment, not shown, the base member and support member are permanently secured together by pins. This modification can be best visualized by reference to FIGS. 13 and 15. In this modification, pin bores are drilled into the sides of member 120, 130 of FIG. 13 or 150, 160 of FIG. 15 such that a pin can be inserted through the pin bore intersecting male member 132 or protrusion 152 to secure the two members together. In this embodiment, the threading in the members may be eliminated. Two or more pins are used to hold the members together and are preferably position generally symmetrical about the sides of the members.

The invention has been described with reference to a preferred embodiment and alternatives thereof. It is believed that many modifications and alternation to the embodiments disclosed will readily suggest themselves to those skilled in the art upon reading and understanding the detailed description of the invention. It is intended to include all such modifications and alternations insofar as they come within the scope of the present invention.

Having thus defined the invention, the following is claimed:

1. A hoist device for fixed engagement to a threaded bore on an outer surface of a load member, said hoist device comprising: a load engaging stud with a force supporting head, a cylindrical body portion with a lower, annular bearing shoulder and a threaded shank depending from said annular shoulder of said body portion; a base member having a body portion with a central passage through said base member and allowing a free swivel engagement of said base member with said load engaging stud when said stud is fixed to said load member by threading said shank through said central passage into said load member bore until said lower bearing shoulder is drawn against said outer surface of said load member, said central passage of said base member having an upper recess for capturing said force supporting head and an upper annular shoulder means for transmitting a force from said base member to said supporting head when said base member is pulled from said load member; a hoist ring having an upper bight portion and a lower generally cylindrical connecting portion; a hoist ring support member with a body portion; means for fixedly securing said support member to said base member while allowing said base member to swivel around said stud; and, a slot in one of said members between said body portion of said support member and the body portion said base member for capturing said connecting portion of said hoist ring between said base member and said support member while allowing said hoist ring to pivot in said slot.

2. A hoist device as defined in claim 1, wherein said body portions are generally cylindrical.

3. A hoist device as defined in claim 1, wherein said slot is in said support member.

4. A hoist device as defined in claim 1, wherein said slot is in said base member.

5. A hoist device as defined in claim 1, wherein said hoist ring is forged steel.

6. A hoist device as defined in claim 1, wherein said hoist ring is cast iron.

7. A hoist device as defined in claim 1, wherein said hoist ring is formed from an elongated bar formed and welded into a ring.

8. A hoist device as defined in claim 1, wherein said securing means are separate bolts.

9. A hoist device as defined in claim 8, wherein said bolts extend from said base member and are threaded into said support member.

10. A hoist device as defined in claim 8, wherein said bolts extend from said support member and are threaded into said base member.

11. A hoist device as defined in claim 1, wherein said securing means includes a female threaded portion on one of said members and a matching male threaded portion on the other of said members whereby said members are secured by rotating one with respect to the other.

12. A hoist device as defined in claim 1, wherein said securing means includes a peripherally extending welded joint between said base member and said support member.

13. A hoist device as defined in claim 1, wherein said upper recess has a height greater than the height of said force supporting head by a first given amount so that the head freely rotates in said recess when said support member is secured to said base member.

14. A hoist device as defined in claim 13, wherein said lower bearing shoulder extends below said base member a second given amount when said upper annular shoulder means engages said force supporting head.

15. A hoist device as defined in claim 14, wherein said second given amount is substantially greater than said first given amount.

16. A hoist device as defined in claim 1, wherein said lower bearing shoulder extends below said base member a second given amount when said upper annular shoulder means engages said force supporting head.

17. A hoist device as defined in claim 1, wherein said stud includes a tool driving portion in said force supporting head.

18. A hoist device as defined in claim 17, wherein said tool driving portion is a socket recess on the top of said head.

19. A hoist device as defined in claim 17, wherein said tool driving portion includes a diametrically extending tool passage through said stud and above said shank and an access opening in said base member registered with said tool passage when said base member and stud are in a given relative angular position whereby an elongated tool can be extended through said opening into said tool passage to rotate said stud and base member in unison until said lower shoulder engages said surface of said load member.

20. A hoist device as defined in claim 19, including an elongated tool used in the hoist device, said elongated tool having a necked down portion between a first end extending into said tool passage and a second end for manual rotation, said necked down portion having a cross-section correlated to a desired amount of torque to be applied to said stud when it is assembled onto said load member.

21. A hoist device for fixed attachment to a threaded bore on an outer surface of a load member, said hoist device comprising: a load engaging stud to be threaded into said bore and base member having a swivel engagement with said stud and adapted to rotate about said stud substantially a full circle of movement; said stud having a head with an outer cylindrical surface with a first diameter, a height and a lower annular face, an intermediate cylindrical shank extending from said annular face and having a lower annular face, a second diameter smaller than said first diameter and a height from said head, a threaded shank to be mounted in said bore extending from said intermediate shank with a third diameter less than said second diameter; said base member having a central opening therethrough to receive said stud, said central opening having an upper recess for rotationally receiving said head and a lower recess for rotationally receiving said intermediate shank with the height of said upper recess being greater than the height of said head and the height of said lower recess being less than the height of said intermediate shank whereby when said shank is threaded in said bore on said load member with said lower face of said intermediate shank against said load member, said base member will rotate about said intermediate shank; a hoist ring having a lower generally cylindrical connecting portion; a hoist ring support member with a body portion; means for fixedly securing said support member to said base member while allowing said base member to swivel around said stud; and slot means in one of said members for capturing said connecting portion of said hoist ring between said base member and said support member while allowing said hoist ring to pivot in said slot means.

22. A hoist device as defined in claim 21, wherein said body portion is generally cylindrical.

23. A hoist as defined in claim 21, wherein said stud includes a tool driving portion in said head.

24. A hoist device as defined in claim 23, wherein said tool driving portion includes a diametrically extending tool passage through said stud and above said shank and an access opening in said base member registered with said tool passage when said base member and stud are in a given relative angular position whereby an elongated tool can be extended through said opening into said tool passage to rotate said stud and base member in unison until said lower annular face of said intermediate cylindrical shank engages said surface of said load member.

25. A hoist device as defined in claim 24, including an elongated tool used in the hoist device, said elongated tool having a necked down portion between a first end extending into said tool passage and a second end for manual rotation, said necked down portion having a cross-section correlated to a desired amount of torque to be applied to said stud when it is assembled onto said load member.

26. A hoist device for fixed attachment to a threaded bore on an outer surface of a load member, said hoist device comprising: a load engaging stud to be threaded into said bore and base member having a swivel engagement with said stud and adapted to rotate about said stud, said stud having a head with an outer cylindrical surface with a first diameter, a height and a lower annular face, an intermediate cylindrical shank extending from said annular face and having a lower annular face, a second diameter smaller than said first diameter and a height from said head, a threaded shank to be mounted in said bore extending from said intermediate shank with a third diameter less than said second diameter; said base member having a central opening therethrough to receive said stud, said central opening having an upper recess for rotationally receiving said head and a lower recess for rotationally receiving said intermediate shank with the height of said upper recess being greater than the height of said head and the height of said lower recess being less than the height of said intermediate shank; and, a hoist ring fixedly secured to said base member while allowing said base member to swivel around said stud.

27. A hoist device for fixed engagement to a threaded bore on an outer surface of a load member, said hoist device comprising: a load engaging stud with a force supporting head, a cylindrical body portion with a lower, annular bearing shoulder and a threaded shank depending from said annular shoulder of said body portion; a base member having a body portion with a central passage through said base member and allowing a free swivel engagement of said base member with said load engaging stud when said stud is fixed to said load member by threading said shank through said central passage into said load member bore until said lower bearing shoulder is drawn against said outer surface of said load member, said central passage of said base member having an upper recess for capturing said force supporting head and an upper annular shoulder means for transmitting a force from said base member to said supporting head when said base member is pulled from said load member; a hoist ring having an upper bight portion and a lower generally cylindrical connecting portion; a hoist ring support member with a body portion; means for fixedly securing said support member to said base member while allowing said base member to swivel around said stud; and, a slot in one of said members between said body portion of said support member and the body portion of said base member for capturing said connecting portion of said hoist ring between said base member and said support member while allowing said hoist ring to pivot in said slot, said stud including a tool driving portion in said force supporting head, said tool driving portion including a diametrically extending tool engaging portion in said stud and at least one access opening in said base member registered with said tool engaging portion when said base member and stud are in a given relative angular position whereby an elongated tool can be extended through said opening into said tool engaging portion to rotate said stud and base member in unison until said lower shoulder engages said surface of said load member.

28. A hoist device for fixed engagement to a threaded bore on an outer surface of a load member, said hoist device comprising: a load engaging stud with a force supporting head, a cylindrical body portion with a lower, annular bearing shoulder and a threaded shank depending from said annular shoulder of said body portion; a base member having a body portion with a central passage through said base member and allowing a free swivel engagement of said base member with said load engaging stud when said stud is fixed to said load member, said lower bearing shoulder for being drawn against said outer surface of said load member, and a hoist ring having an upper bight portion and a lower generally cylindrical connecting portion, said cylindrical connecting portion fixedly secured to said base member while allowing said base member to swivel around said stud, said stud including a tool driving portion in said force supporting head, said tool driving portion including a diametrically extending tool engaging portion in said stud and at least one access opening in said base member registered with said tool engaging portion when said base member and stud are in a given relative angular position whereby an elongated tool can be extended through said opening into said tool engaging portion to rotate said stud and base member in unison until said lower shoulder engages said surface of said load member.

* * * * *